US007656955B2

(12) United States Patent
Manstorfer et al.

(10) Patent No.: US 7,656,955 B2
(45) Date of Patent: Feb. 2, 2010

(54) DEVICE FOR IMPROVING THE TRANSMISSION PROPERTIES OF A BUNDLE OF ELECTRICAL DATA LINES AND A SYSTEM FOR TRANSMITTING DATA

(75) Inventors: Karl Manstorfer, Deutschland (DE); Reinhard Hecht, Deutschland (DE)

(73) Assignee: Vierling Communications GmbH, Ebermannstadt (DE)

( * ) Notice: Subject to any disclaimer, the term of this patent is extended or adjusted under 35 U.S.C. 154(b) by 943 days.

(21) Appl. No.: 10/483,685

(22) PCT Filed: Jul. 15, 2002

(86) PCT No.: PCT/EP02/07783

§ 371 (c)(1),
(2), (4) Date: Jun. 25, 2004

(87) PCT Pub. No.: WO03/009490

PCT Pub. Date: Jan. 30, 2003

(65) Prior Publication Data

US 2004/0233999 A1      Nov. 25, 2004

(30) Foreign Application Priority Data

Jul. 13, 2001      (EP)      .................................. 01116651

(51) Int. Cl.
*H04B 3/00*      (2006.01)
*H03H 7/30*      (2006.01)
*H04J 3/10*      (2006.01)

(52) U.S. Cl. ...................... 375/257; 375/232; 370/201; 379/406.08

(58) Field of Classification Search ................... 375/22, 375/219, 220, 229, 230, 232, 233, 235, 257, 375/288, 286, 285, 346, 350, 231, 222, 258; 370/201, 276, 282, 283, 286, 289; 333/28 R, 333/24 R, 206, 202, 222, 219, 18; 379/93.01, 379/400, 402–404, 413.02, 413.03, 414, 379/415, 417, 406.01, 406.05, 406.06, 406.08, 379/406.15, 416

See application file for complete search history.

(56) References Cited

U.S. PATENT DOCUMENTS 5,271,037 A      12/1993      Szechenyi ..................... 375/14

(Continued)

FOREIGN PATENT DOCUMENTS

WO      WO 9305550 A1 *      3/1993
WO      WO 97/40587      10/1997

*Primary Examiner*—David C Payne
*Assistant Examiner*—Vineeta S Panwalkar
(74) *Attorney, Agent, or Firm*—Perman & Green LLP

(57) ABSTRACT

The invention relates to a device for improving the transmission properties of a bundle of electrical data lines, particularly of a bundle of copper twin wires, and to a system for transmitting data that is provided with a device of this type. Said device comprises at least one adaptive filter, which generates an output signal for correcting the signal transmitted on a first data line. At least one signal tapped by a second data line or an external signal is used as a reference signal for the adaptive filter, and the corrected signal transmitted on the first data line is used as an error signal for the adaptive filter. According to the invention, the device is situated in the transmission path whereby improving the transmission properties of the cable independent from the switched-on transmission units and employed transmission techniques, particularly in the event of high bit rate transmission.

15 Claims, 5 Drawing Sheets

U.S. PATENT DOCUMENTS

| | | | |
|---|---|---|---|
| 5,887,032 A | 3/1999 | Cioffi | 375/257 |
| 5,953,412 A * | 9/1999 | Sheets et al. | 379/414 |
| 5,970,088 A | 10/1999 | Chen | 375/222 |
| 6,014,371 A * | 1/2000 | Betts | 370/286 |
| 6,052,420 A * | 4/2000 | Yeap et al. | 375/346 |
| 6,160,790 A * | 12/2000 | Bremer | 370/201 |
| 6,965,657 B1 * | 11/2005 | Rezvani et al. | 375/346 |
| 6,987,800 B2 * | 1/2006 | Nordstrom et al. | 375/220 |
| 7,023,908 B2 * | 4/2006 | Nordstrom et al. | 375/222 |
| 2002/0093908 A1 * | 7/2002 | Yeap | 370/201 |
| 2002/0150059 A1 * | 10/2002 | Blake | 370/286 |

* cited by examiner

DEVICE FOR IMPROVING THE TRANSMISSION PROPERTIES OF A BUNDLE OF ELECTRICAL DATA LINES AND A SYSTEM FOR TRANSMITTING DATA

This application claims the benefit of the earlier filed International Application No. PCT/EP02/07783/, International Filing Date, Jul. 15, 2002, which designated the United States of America, and which international application was published under PCT Article 21(2) as WO Publication No. WO 03/009490 A3.

The invention relates to an apparatus for improvement of the transmission characteristics of a bundle of electrical data lines as claimed in claim 1, and to an arrangement for data transmission as claimed in claim 11.

When data is being transmitted via two or more data lines which are in immediate physical proximity of one another, the problem of crosstalk arises, in particular near-end and/or far-end crosstalk (NEXT and FEXT, respectively). Problems such as these occur in particular in the circuitry of the copper cables (which are actually designed for low-frequency transmission) in the access area from a telecommunications network to high bit-rate transmission systems. High bit-rate transmission systems such as xDSL (Digital Subscriber Line, for example HDSL, SDSL, ADSL, VDSL) have been developed in order to make it possible to use the existing infrastructure of double copper wires in local network cables and other telecommunication cables for the transmission of high-speed data streams. The multiple or mixed connection of these cables to different transmission techniques frequently leads to the problem of spectral incompatibility. In this case, two or more transmission devices which are connected to a common cable interfere with one another. The telecommunications cables can frequently not be used optimally. The transmission capacity which can be achieved for a predetermined transmission quality is limited. In consequence, it is either not possible to connect all of the wire pairs, or there are restrictions on the distances that can be covered.

The influence of the interference can be kept low by matching the transmission appliances that are connected to the cable bundle to one another, in particular by synchronizing them. However, this is complex and leads to restrictions relating to the modem and transmission techniques that are used.

By way of example, a compensation method for a pool comprising N identical logical MDSL modems is known from U.S. Pat. No. 5,970,088. This is used to compensate for the NEXT interference. The modem transmitters are synchronized to a clock generator. The signals which are received by the N modems are suppressed, after reception, by means of a compensation circuit. The compensation circuit comprises N subunits, each of which has its own associated modem. One subunit comprises N adaptive filters, whose output signal is used for correction of the signal which has already been received and digitized by the modem. The transmission signal which is transmitted by in each case one of the N modems is used as a reference signal for the adaptive filters. The output signals from all the adaptive filters in a subunit are combined, and are used for correction of the received signal which has already been received. The compensation method which is described in U.S. Pat. No. 5,970,088 requires N identical modems, and is therefore not suitable for suppression of undefined systems. The transmission characteristics of the cable itself remain unchanged, and the signal which has already been received is subsequently processed.

The invention is based on the object of specifying an apparatus by means of which the transmission characteristics of a bundle of electrical data lines are improved, so that this makes it possible to provide suppression between the lines, and thus to increase the transmission capacity, irrespective of the appliances which are connected to the data lines.

The object is achieved by an apparatus for improvement of the transmission characteristics of a bundle of electrical data lines having the features of claim 1. The object is also achieved by an arrangement for data transmission by means of an apparatus such as this, as claimed in claim 11. Advantageous developments of the invention are specified in the dependent claims, in the description and in the drawings.

According to the invention, the apparatus comprises an electronic circuit which is arranged between two connections. The electronic circuit comprises at least one adaptive filter, by means of which a signal which is transmitted on a first line is suppressed. The connections are used for connection to one or more cable bundles and/or to one or more transmission appliances, which may be terminals. At least one of the connections, for example the input to the apparatus, is preferably connected to a cable bundle such that the data lines in the cable bundle make contact with the electronic circuit, or with its data lines. The other connection may be designed for connection of further cable bundles, or for connection of transmission appliances.

When in use, this simulates the output of the cable bundle which is connected to the input of the apparatus. As a result of the connections, the apparatus acts as a "black box", which can be arranged at suitable points within the transmission path, for example between the cable ends and their transmission appliance, or between two cables. For this purpose, the apparatus preferably also has a housing, in which the circuit is arranged. The apparatus can be installed universally and with little effort.

Since the apparatus is arranged within the transmission path, that is to say at one or both ends of the cable bundle, the transmission characteristics of the cable bundle itself are improved. There is no need for any knowledge about the transmission techniques or about the connected transmission appliances that are used. The apparatus is completely transparent and is independent of the structure of the connected appliances. In contrast to known suppression circuits which are arranged within the transmission appliances, no intervention whatsoever is required in the transmission appliances according to the invention. The process is carried out using the signals which the transmission appliance emits or receives at its conventional interfaces to the cable bundle. Any desired transmission appliances, including future transmission appliances, can thus be used. The network operators and customers need therefore not be subjected to any restrictions with regard to the appliances and transmission techniques which are used, in order to achieve a high transmission performance and quality.

Adaptive filters for reduction of and compensation for interference of an unknown nature on a signal line are known per se. These are described, for example, in B. Widrow and S. Stearns, "Adaptive Signal Processing", Prentice-Hall, Inc., New Jersey, 1985. A useful signal which is to be suppressed and is transmitted on a signal line is composed of the signal without interference and of the interference influence from the unknown signal source. A signal which is correlated with this signal source is supplied as a reference signal to an adaptive filter. The filter produces a compensation signal, which is subtracted from the useful signal. The compensated useful signal obtained in this way is supplied as a fault signal to the filter. The filter parameters are set via a suitable adaptation algorithm such that the power in the compensated useful signal is minimized and which thus ideally corresponds to the signal without interference.

The invention can be implemented in a large number of embodiments, some of which are illustrated in the drawings. Each line to be suppressed has at least one associated adaptive filter that produces a compensation signal which is subtracted from the useful signal transmitted on the line. At least one signal which is tapped off from a further line is used as a reference signal for the adaptive filter, so that the interference influence, for example NEXT and/or FEXT, on the signals which are transmitted on this line is reduced. In this variant of the invention, one adaptive filter is provided for each pair of lines to be decoupled. It is also possible to tap off the reference signals from only those lines that are used for transmission.

In order to reduce the number of adaptive filters, the signals which are tapped off from the lines that are subject to interference are, in a further variant, combined to form a common reference signal, with, for example, their direct or weighted sum being formed. This reference signal is then supplied to a common adaptive filter.

In a further advantageous embodiment, the reference signal is tapped off from a line which is not connected. This signal is a map of all the interference influences on adjacent lines that are used for transmission or reception. The signal which is tapped off thus essentially also indicates the corresponding interference influences on the line to be suppressed. If it is used according to the invention as a reference signal for an adaptive filter, this allows rapid adaptation of the filter, and hence rapid compensation.

In a further preferred embodiment, a reference signal is tapped off outside the cable bundle, for example from an external antenna. This also allows external interference influences on individual data lines or on all the data lines to be compensated for.

In order to install the apparatus according to the invention in the transmission path, there are preferably two connections, with one connection being used, for example, for connection of the cable bundle to be suppressed and the other being used for connection of a cable bundle which leads to one or more subscribers, or for direct connection of transmission appliances, for example xDSL appliances. The apparatus also has a bundle, which connects the connections, of apparatus-internal connecting lines, with these connecting lines having at least one connecting point via which reference and/or fault signals can be tapped off and/or correction signals can be supplied. There is therefore no need to carry out any modifications on the external cable itself.

In order to suppress wire pairs, the apparatus furthermore has hybrid circuits, by means of which the transmission and received signals which are jointly located on each connected wire pair in the cable bundle are separated, and are each associated with their own internal connecting line. The reference and fault signals for setting the adaptive filters can then be tapped off at a suitable point on these connecting lines, and the correction signals that are produced can be supplied. The data flow is not interrupted in the event of a failure on the adaptive filters, for example in the event of a power failure.

In order to achieve compensation that is as good as possible, each data line is decoupled from every other data line by, for example, providing an adaptive filter for every other data line or by supplying the signals that are tapped off from the further data lines as a reference signal to a common adaptive filter. Since the crosstalk is highly dependent on distance, it may for many applications be sufficient to provide suppression only between the immediately adjacent data lines. In the case of telecommunications cables, two pairs of double copper wires are frequently twisted with one another. Two or more such star groups of four are contained in one common basic bundle. Two or more such basic bundles in turn form the telecommunications cable. In a case such as this, at least the data lines in one star group of four and, particularly preferably those in a basic bundle, are preferably suppressed with respect to one another.

A large number of adaptation methods for setting the adaptive filters are known, which all have the aim of minimizing the compensated signal (fault signal). For example, it is possible to use a least mean square (LMS) algorithm, the RLS algorithm (Recursive Least Squares Algorithm), self-recovering equalization or blind equalization algorithms, or any other suitable method. The power minimization method has the advantage that the apparatus according to the invention is transparent with respect to the transmission rates, line codes and other transmission parameters, and that no training or synchronization processes are required.

Exemplary embodiments of the invention will be described in the following text and are illustrated in the drawings, in which, illustrated purely schematically:

Figure 1:
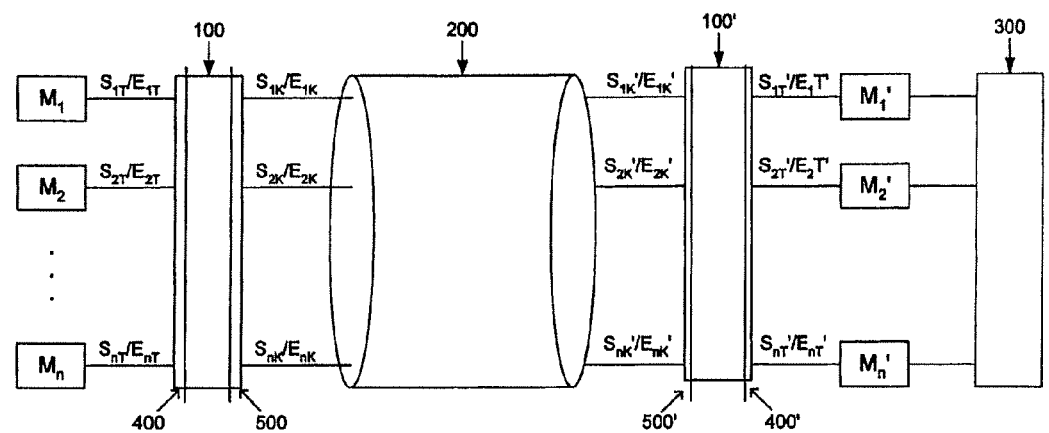
FIG. 1 shows the basic arrangement of two apparatuses according to the invention within a transmission path.

FIG. 1 shows an arrangement according to the invention for data transmission in an application with a central switching device 300 and two or more transmission appliances $M_1$, $M_2 \ldots M_n$ and $M_{1'}, \ldots M_{2'}, \ldots M_{n'}$ which are preferably xDSL modems. The transmission appliances $M_1$ and $M_{1'}$, $M_2$ and $M_{2'} \ldots M_n$ and $M_{n'}$ represent any given $1 \ldots n$ xDSL connections, which are connected via in each case one wire pair $S_1/E_1$, $S_2/E_2 \ldots S_n/E_n$. The reference symbols $S_{iT}$, $S_{ik}$, $S'_{iT}$, $S'_{iK}$, $E_{iT}$, $E_{ik}$, $E'_{iT}$, $E'_{ik}$ each denote the subscriber-end or cable-end element of the transmission or reception path at the two cable ends. The wire pairs are combined to form a bundle 200 of lines, and are located in the immediate physical vicinity of one another in the area of this cable. In order to compensate for the interference influences between them, one apparatus or if required two apparatuses according to the invention 100 and 100' is or are located in the transmission path between the modems and the wire pairs of the cable. At their switching end, the individual wire pairs in the cable bundle 200 are connected to the transmission appliances $M_{1'}$, $M_{2'} \ldots M_{n'}$. At their subscriber ends, the individual wire pairs are connected to the transmission appliances $M_1$, $M_2 \ldots M_n$. A first connection 400, 400' is respectively used for this purpose. A second connection 500, 500' is respectively used for connection of the cable bundle. The subscriber-end wire pairs may also be combined to form a further cable bundle.

Figure 2:
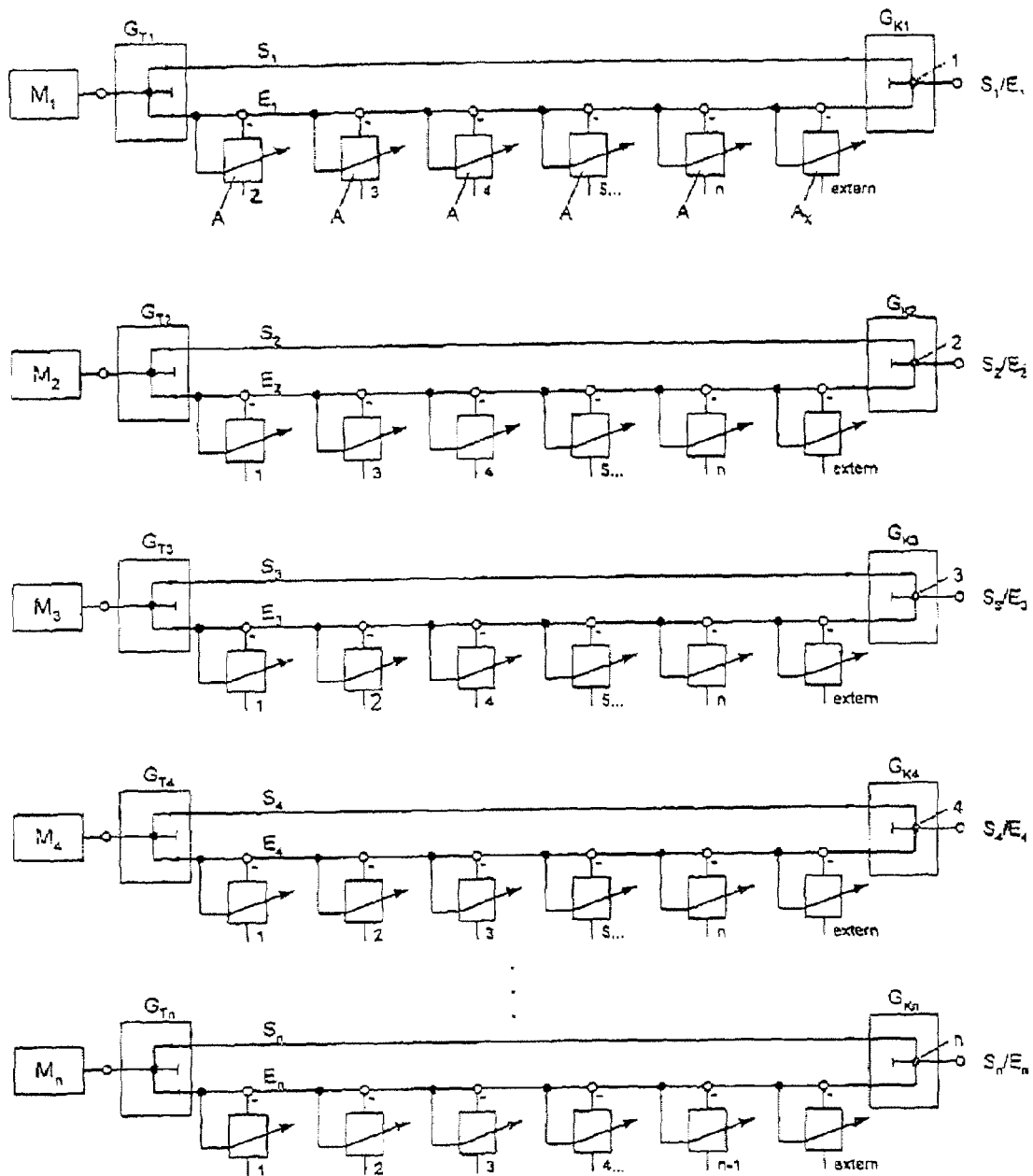
FIG. 2 shows a first example of a circuit arrangement according to the invention with a reference point for each wire pair.

FIG. 2 shows a first example of a circuit arrangement which can be used in an apparatus according to the invention. Two or more wire pairs $S_1/E_1$, $S_2/E_2 \ldots S_n/E_n$ which are connected both to the transmission signal and to the received signal of the associated modem pair $M_1$-$M_{1'}$, $M_2$-$M_{2'} \ldots M_n$-$M_{n'}$ are suppressed with respect to one another and with respect to an external interference source. For this purpose, each wire pair in the cable bundle which contributes to interference with the other wire pairs is split by means of highly effective hybrid circuits $G_{K1}, G_{K2} \ldots G_{Kn}$ at the cable end and $G_{T1}, G_{T2} \ldots G_{Tn}$ at the subscriber end into the transmission lines $S_1, S_2 \ldots S_n$ and the reception lines $E_1, E_2 \ldots E_n$. Each reception line $E_1$, $E_2 \ldots E_n$ has n adaptive filters A associated with it for suppression of the received signals, where n indicates the number of wire pairs that are present. The adaptive filters receive, as their reference signal, the signal which is tapped off at the cable-end junction point 1, 2 . . . n of in each case one adjacent wire pair. This signal comprises the signal which is transmitted and received on this wire pair, as well as the interference signals from the adjacent wire pairs. Two wire pairs are thus in each case associated with one adaptive filter in order to suppress the signal which is transmitted on the first reception line, for example $E_1$, with respect to the signal which is transmitted on a further wire pair, for example $S_2/E_2$. A further adaptive filter $A_x$ is provided in order to compensate for any external interference influence. Overall, this circuit arrangement according to the invention has a matrix comprising n×n adaptive filters, which are used to compensate for all of the interference influences interactively. Since the reference signal is tapped off at the junction point between adjacent wires, compensation is provided both for the near-end crosstalk and for the far-end crosstalk.

Figure 3:
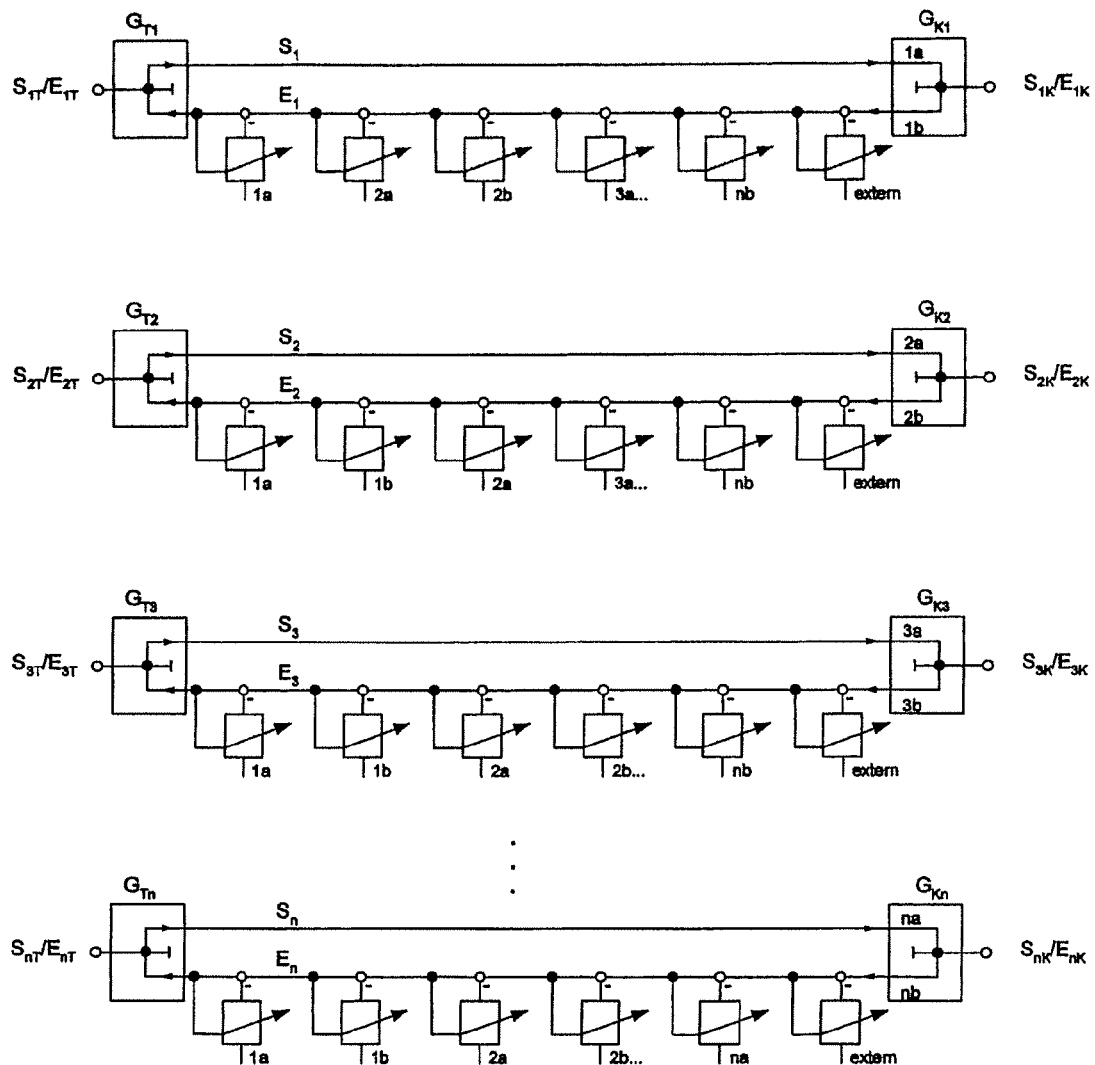
FIG. 3 shows a further example of a circuit arrangement according to the invention with two reference points for each wire pair.

FIG. 3 shows a further circuit arrangement in which, for example, two reference points 2*a*, 2*b*; . . . na, nb and the corresponding number of adaptive filters are used for suppression of the received signal on the wire pair $S_1/E_1$ for each adjacent wire pair that is subject to interference. The transmission and received signals are used separately as reference signals. Furthermore, an adaptive filter is provided for that specific wire pair, which taps off as the reference signal the signal which is transmitted from its own modem at the reference point 1*a*, and thus provides echo compensation. As in the case of the circuit arrangement shown in FIG. 2, a further adaptive filter is provided in order to compensate for external interference.

Figure 4:
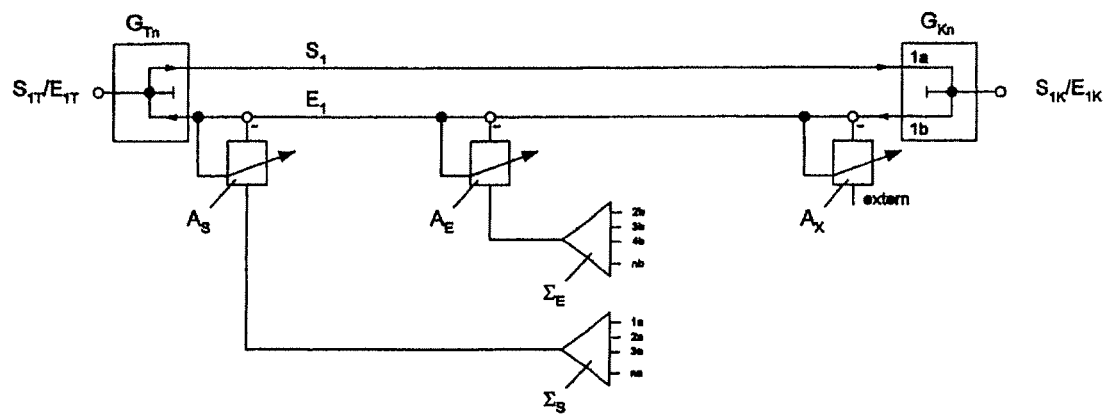
FIG. 4 shows a further example of a circuit arrangement according to the invention with in each case one addition element for transmission and received signals on adjacent lines.

FIG. 4 shows a further example of a circuit arrangement according to the invention, with only one wire pair and the associated adaptive filters being illustrated. Each wire pair generally has three associated adaptive filters $A_s, A_E, A_x$. One filter $A_s$ receives as the reference signal the sum (added up in an addition element $\Sigma_s$) of all the transmission signals from all of the wire pairs, or only from the other wire pairs. The second filter $A_E$ receives as a reference signal the sum (added up in an addition element $\Sigma_E$) of all the received signals on the other wire pairs. A filter $A_x$ is used to compensate for external interference. The reference points 1*a*, 1*b*. . . na, nb correspond to those in FIG. 3. This arrangement can be implemented easily and cost-effectively, since the number of adaptive filters is less than that in the examples shown in FIGS. 2 and 3.

Figure 5:
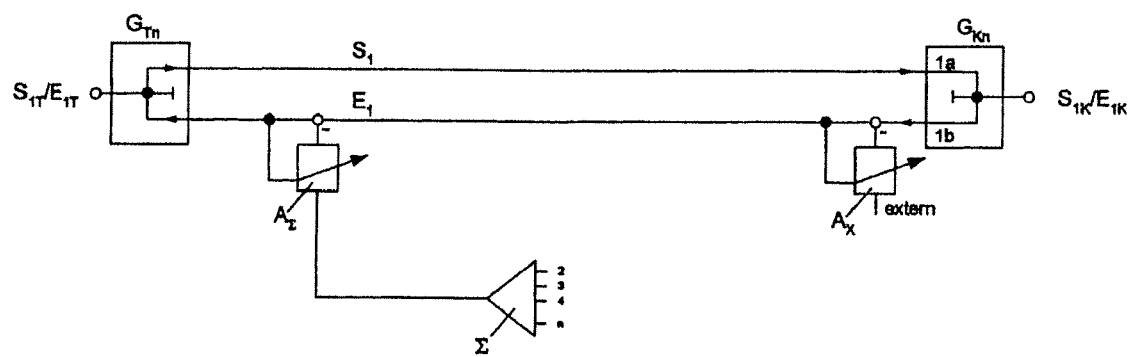
FIG. 5 shows a further circuit arrangement according to the invention having an addition element for all interference signals.

FIG. 5 illustrates a further simplification, in which only one adaptive filter $A_\Sigma$ is provided for all of the interference signals which are tapped off from adjacent wire pairs. These interference signals are added up in an addition element $\Sigma$, with the sum signal being used as a reference signal. A filter $A_x$ is once again used to compensate for external interference.

In a further simplification of the circuit arrangement, it is feasible for the function of $A_x$ to be integrated in $A_\Sigma$, so that $A_x$ may be omitted.

A further simplification is obtained by the supplier using an unconnected wire pair for the reference signals. If this wire pair is in a suitable position within the cable, all of the interference signals will, of course, be present on it. There is therefore no need for the addition element, which can be replaced by an operational amplifier to which the reference wire pair is connected and which provides the interference signal in a decoupled form to each transversal filter. A filter $A_x$ is once again used to compensate for external interference.

In a further possible embodiment of the predetermined solution variant, the reference wire pair and the external interference signal are connected to an addition element which now has only two inputs. In consequence, this saves the adaptive filter $A_x$.

The invention claimed is:

1. An apparatus for improvement of the transmission characteristics of a bundle of electrical data lines, in particular of a bundle of copper double wires, having an electronic circuit arranged between a first connection being used for connection to an external bundle of electrical data lines and a second connection being used for connection to data lines of a further external bundle of electrical data lines and/or to one or more external transmission appliances, the electronic circuit comprising at least one adaptive filter producing an output signal for correction of a received signal of a first data line of the external bundle of electrical data lines, a reference signal for said at least one adaptive filter being at least a signal which is tapped off from a second data line of the external bundle of electrical data lines and/or an external signal, and a fault signal for said at least one adaptive filter being the corrected received signal of the first data line of the external bundle of electrical data lines;

wherein a bundle connects the first and second connections, of apparatus-internal connecting lines, with the apparatus-internal connecting lines having at least one connecting point, via which reference and/or fault signals can be tapped off and/or correction signals can be supplied.

2. The apparatus as claimed in claim 1, wherein each data line to be suppressed has two or more associated adaptive filters, which each receive a reference signal, which is tapped off from in each case a further data line of the external bundle of electrical data lines, as reference signals.

3. The apparatus as claimed in claim 1, wherein said at least one adaptive filter receives a reference signal which is a combination of the signal which is tapped off from the second data line of the external bundle of electrical data lines and one or more signals which are tapped off from further data lines of the external bundle of electrical data lines, preferably the sum of these signals.

4. The apparatus as claimed in claim 1, wherein the second data line is not used for data transmission.

5. The apparatus as claimed in claim 1, wherein the external signal is tapped off from an antenna which is arranged outside the external bundle of electrical data lines.

6. The apparatus as claimed in claim 1, wherein the fault signal is applied to a first connecting line which is associated with the first data line, and the reference signal is tapped off from a second connecting line, which is associated with the second data line, for suppression of the first data line.

7. The apparatus as claimed in claim 1, wherein the bundle of electrical data lines comprises wire pairs which are each formed from two electrical data lines and on which transmission and received signals can be transmitted jointly, with the apparatus for each wire pair having two apparatus-internal connecting lines and corresponding hybrid circuits, by means of which the transmission and received signals are separated and are in each case associated with their own apparatus-internal connecting line.

8. The apparatus as claimed in claim 6, wherein the received signal is in each case suppressed by using as the reference signal the transmission signal or the combined transmission and received signal on at least one further wire pair, or a combined transmission or transmission and received signal on two or more further wire pairs, by tapping off from the appropriate apparatus-internal connecting lines.

9. The apparatus as claimed in claim 6, wherein the wire pairs are used for data transmission based on an xDSL method.

10. A bundle of electrical data lines (cables), transmission appliances and at least one apparatus as claimed in claim 1, which is arranged in at least one of the cable ends in the transmission path.

11. The arrangement as claimed in claim 10 wherein the apparatus is an electrical circuit device formed on a main distribution board.

12. The arrangement as claimed in claim 10, wherein xDSL devices are connected to the cable and/or directly to the apparatus.

13. The apparatus as claimed in claim 2, wherein one of the further data lines of the external bundle of electrical data lines is not used for data transmission.

14. The apparatus as claimed in claim 2, wherein a further associated adaptive filter receives as reference signal an external signal tapped off from an antenna which is arranged outside the external bundle of electrical data lines.

15. The apparatus as claimed in claim 3, wherein the combination additionally comprises an external signal tapped off from an antenna which is arranged outside the external bundle of electrical data lines.

* * * * *